(12) United States Patent
Isaksson

(10) Patent No.: US 6,382,885 B2
(45) Date of Patent: May 7, 2002

(54) TOOL EXTENDER AND TOOL ASSEMBLY

(75) Inventor: Anders Isaksson, Sandviken (SE)

(73) Assignee: Sandvik AB, Sandviken (CH)

( * ) Notice: Subject to any disclaimer, the term of this patent is extended or adjusted under 35 U.S.C. 154(b) by 0 days.

(21) Appl. No.: 09/735,486

(22) Filed: Dec. 14, 2000

(30) Foreign Application Priority Data

Dec. 21, 1999 (SE) .............................................. 9904708

(51) Int. Cl.⁷ .............................................. B23B 51/12
(52) U.S. Cl. .............................. 408/239 A; 408/239 R; 279/145
(58) Field of Search ........................ 408/239 A, 239 R, 408/238, 26; 279/145, 143, 8

(56) References Cited

U.S. PATENT DOCUMENTS

| 756,377 A | | 4/1904 | Kimber | |
|---|---|---|---|---|
| 3,691,883 A | * | 9/1972 | Ingram | 82/152 |
| 3,719,367 A | * | 3/1973 | Baturka | 279/145 |
| 3,970,406 A | * | 7/1976 | Kubicek | 408/127 |
| 4,602,798 A | * | 7/1986 | Wettstein | 279/48 |
| 5,716,173 A | * | 2/1998 | Matsumoto | 408/239 |
| 5,807,038 A | * | 9/1998 | Skinner | 408/204 |
| 6,035,512 A | * | 3/2000 | Cook | 29/447 |

* cited by examiner

*Primary Examiner*—Henry Tsai
(74) *Attorney, Agent, or Firm*—Burns, Doane, Swecker & Mathis, L.L.P.

(57) ABSTRACT

A tool extender and tool assembly is provided. The tool includes a shank extending from a working portion. The shank includes a bushing, a first guide portion, an externally threaded portion, and a second guide portion arranged successively in a direction away from the working portion. The tool extender includes a first end and a second end. The tool extender includes a substantially cylindrical bore in which the shank is receivable up to the bushing, the bushing abutting against a forward edge of the tool extender at the first end. The bore includes a first internal guide portion, an internally threaded portion for mating with the externally threaded portion, and a second internal guide portion arranged successively in a direction toward the second end of the tool extender.

25 Claims, 2 Drawing Sheets

TOOL EXTENDER AND TOOL ASSEMBLY

FIELD OF THE INVENTION

The present invention relates to a tool extender and tool assembly and, more particularly, to a tool extender and tool assembly having guides for enhancing stability of the tool relative to the tool extender.

BACKGROUND AND SUMMARY

One technique for securing tool bits such as drill bits or milling inserts, such as ball nose end mill inserts, to chucks of drill presses or milling machines is to provide an internally threaded chuck and an externally threaded tool bit that mates with the internal thread of the chuck. U.S. Pat. No. 756,377 discloses a chuck for rock drilling machines that has an internally threaded, tapered hole that receives a split nut that can secure a tool bit when threaded into the chuck. A disadvantage to the type of device disclosed in U.S. Pat. No. 756,377 is that forces on the tool bit may be transmitted through the split nut to the threads and damage the threads, requiring replacement of the split nut and the chuck.

Adjustable chucks are common today, and typically are capable of clamping a range of different diameter tool bit shanks. Certain adjustable chucks are not, however, ideally suited for clamping all shanks. For example, Sandvik AB, Sandviken, Sweden, produces CAPTO tools in which a polygonal chuck opening is ideally suited for clamping polygonal shanks. Tool bits that have customary cylindrical shanks do not fully enjoy the advantages of the CAPTO system. It is desirable to provide tool users with an alternative to replacing all of their tools for use with new toolholder systems.

The present invention permits tool users to use existing tool supplies with new toolholder systems. Moreover, the present invention permits tools to be secured relative to chucks in an accurate fashion that minimizes the possibility of the tools being misaligned relative to an axis of rotation of the tools. Further, the present invention permits use of tools having threads with toolholders having threads that minimizes the potential for damage to the threads.

According to an embodiment of the present invention, a tool extender and tool assembly is provided. The tool includes a first and a second end, a working portion for performing an operation on a workpiece being provided at the first end and a shank extending from the working portion to the second end. The shank includes a bushing, a first guide portion, an externally threaded portion, and a second guide portion arranged successively in a direction away from the working portion. The tool extender includes a first end and a second end. The tool extender includes a substantially cylindrical bore in which the shank is receivable up to the bushing, the bushing abutting against a forward edge of the tool extender at the first end. The bore includes a first internal guide portion, an internally threaded portion for mating with the externally threaded portion, and a second internal guide portion arranged successively in a direction toward the second end of the tool extender. The tool and the tool extender are shaped such that, when the bushing abuts against the forward edge of the tool extender and the internally threaded portion and the externally threaded portion are mated, the first guide portion and the second guide portion are disposed adjacent the first internal guide portion and the second internal guide portion of the bore.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
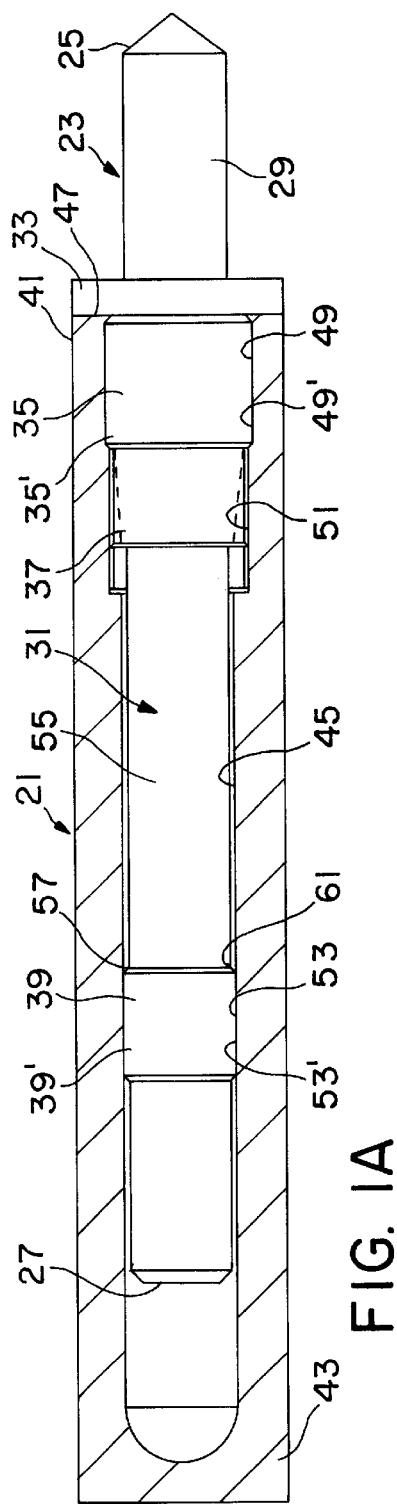
FIG. 1A is a side, partially cross-sectional view of a tool extender and tool assembly according to an embodiment of the present invention.
Figure 1B:
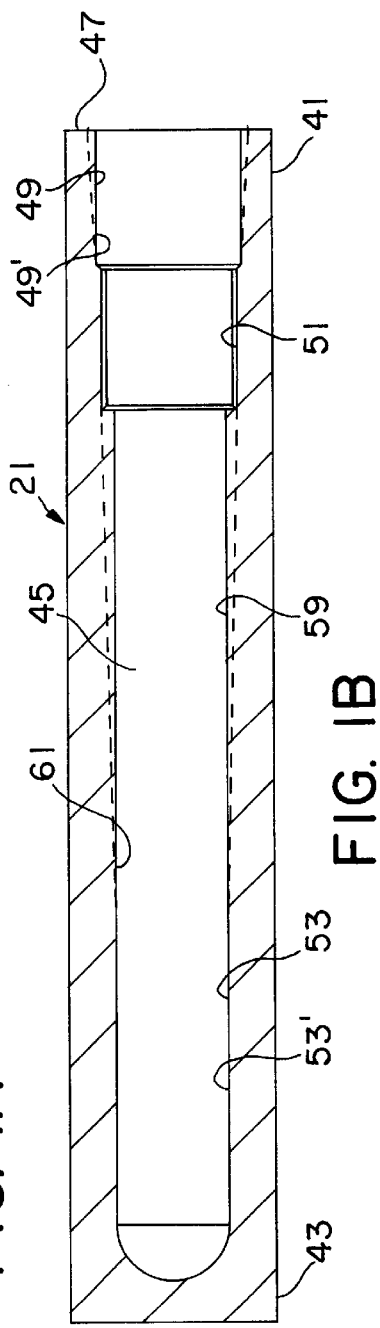
FIG. 1B is a side, cross-sectional view of the tool extender of FIG. 1A.
Figure 1C:
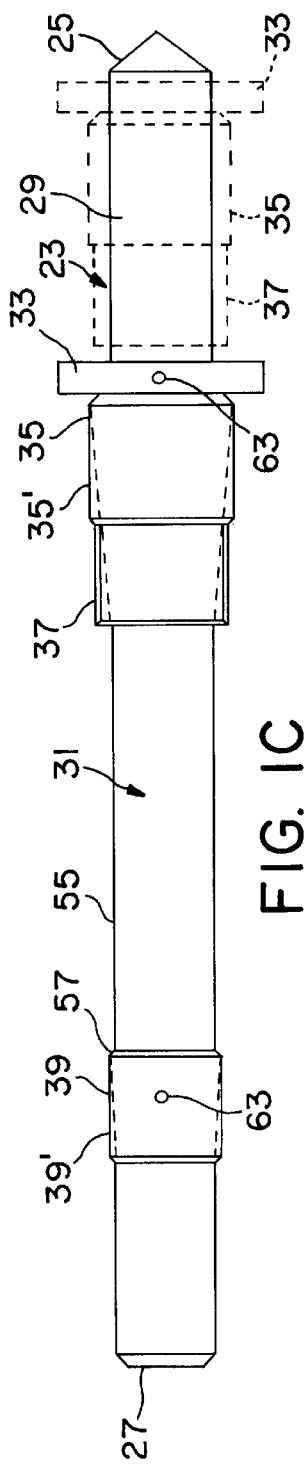
FIG. 1C is a side view of the tool of FIG. 1A.

An assembly comprising a tool extender 21 and tool 23 according to an embodiment of the present invention is shown in FIG. 1A. FIGS. 1B and 1C show the tool extender 21 and the tool, respectively. The tool 23 includes a first and a second end, 25 and 27, respectively. A working portion 29 for performing an operation on a workpiece is provided at the first end 25 of the tool, and a shank 31 extends from the working portion to the second end 27. The shank 31 includes a bushing 33, a first guide portion 35, an externally threaded portion 37, and a second guide portion 39 arranged successively in a direction away from the working portion 29 toward the second end 27 of the tool 23. The tool 23 is preferably a rotating tool, such as a drilling or a milling tool.

The tool extender 21, or tool adaptor, also includes a first end 41 and a second end 43. The tool extender 21 is preferably at least partially tubular and preferably includes a substantially cylindrical bore 45 in which the shank 31 is receivable up to the bushing 33. The bushing 33 abuts against a forward edge 47 of the tool extender 21 at the first end 41 of the tool extender. The bore 45 includes a first internal guide portion 49, an internally threaded portion 51 for mating with the externally threaded portion 37, and a second internal guide portion 53 arranged successively in a direction toward the second end 43 of the tool extender 21. The tool extender 23 is preferably adapted to be secured in the chuck of a machine such as a drill or a mill and may have any suitable configuration for the securement at the second end 43 of the tool extender. For example, the second end 43 may be suitable for attachment in a particular chuck which will not accept the second end 27 of the tool 23 or for which the second end of the tool is not as ideally configured as the second end of the tool extender. The tool extender 21 and tool 23 assembly according to the present invention eliminates a need to replace a collection of otherwise usable tools when, for example, a drill press usable with the tools is replaced with a new drill press that has a different style of chuck.

The tool 23 and the tool extender 21 are shaped such that, when the bushing 33 abuts against the forward edge 47 of the tool extender and the internally threaded portion 51 and the externally threaded portion 37 are mated, the first guide portion 35 and the second guide portion 39 are disposed adjacent the first internal guide portion 49 and the second internal guide portion 53 of the bore 45. The external diameters of the first and second guide portions 35 and 39 are preferably substantially the same as or slightly smaller than the internal diameters of the first and second internal guide portions 49 and 53, respectively, so that the first and second guide portions are axially and rotatably movable relative to the first and second internal guide portions, but with minimal play.

The bushing 33 is preferably spaced on the shank 31 relative to the externally threaded portion 37 such that, when the bushing abuts against the forward edge 47 of the tool extender 21, the externally threaded portion is not completely threaded into the bottom of the internally threaded portion 51 of the tool extender. In this way, the possibility of damage to the threads by overtightening of the tool 23 relative to the tool extender 21 is minimized. The internally threaded portion 51 and the externally threaded portion 37 are preferably threaded in a direction opposite an intended direction of rotation of the tool 23 during operation so that, when the tool and tool extender 23 assembly is in use, the turning action of the tool will tend to tighten the tool relative to the tool extender, rather than loosen it.

By providing the first and second guide portions 35 and 39 together with the first and second internal guide portions 49 and 53 according to the present invention, it is possible to provide a high degree of support to the tool 23 in the tool extender 21. Moreover, the assembly according to the present invention minimizes the possibility of improper axial alignment of the tool relative to the tool extender or damage to the threads due to forces on the working portion 29. In an ordinary tool extender without features of the present invention such as the second guide portion and the second internal guide portion, forces on the working portion would be opposed largely by the threads, risking damage to the tool extender and the tool.

The first guide portion 35 and the second guide portion 39 are illustrated as being circularly cylindrical. Similarly, the first internal guide portion 49 and the second internal guide portion 53 are illustrated as being circularly cylindrical. It is also possible to provide conical first and second guide portions 35' and 39' and conical first and second internal guide portions 49' and 53', as illustrated by dotted lines in FIG. 1C. If desired or necessary, conical internal guide portions may be used with cylindrical internal guide portions, and cylindrical internal guide portions may be used with conical guide portions However, it is presently preferred for cylindrical guide portions to be used with cylindrical internal guide portions and conical guide portions to be used with conical internal guide portions so that the maximum area of the guide portions and the internal guide portions are adjacent to each other and provide the greatest support against forces on the tool 23.

The guide portions are preferably circular in cross-section so that a maximum surface area of the guide portions can contact a maximum surface area of the internal guide portions. If desired or necessary, the guide portions or the internal guide portions can be other than circular in cross-section or circular, provided that they are shaped so that rotation of the tool 23 relative to the tool extender 21 is possible, such that there is merely line or point contact between the guide portions and the internal guide portions. For example, the guide portions may be square or elliptical, and the internal guide portions may be circular but have a sufficient diameter to permit rotation of the guide portions relative to the internal guide portions.

In the embodiment shown in FIGS. 1A–1C, a portion 55 of the shank 31 between the externally threaded portion 37 and a first end 57 of the second guide portion 39 closest to the first end 25 of the tool 23 is of a smaller diameter than the first end of the second guide portion. A portion 59 of the bore 45 between the internally threaded portion 51 and a first end 61 of the second internal guide portion 53 closest to the first end 41 of the tool extender 21 is of an equal diameter to the first end of the second internal guide portion. The portion 59 of the bore 45 between the internally threaded portion 51 and the first end 61 of the second internal guide portion 53 closest to the first end 41 of the tool extender 21 will be of a lesser diameter than the internally threaded portion, and the second guide portion 39 will also be of a lesser diameter than the internally threaded portion so that the second guide portion can be slid past the internally threaded portion during installation of the tool 23.

Figure 2A:
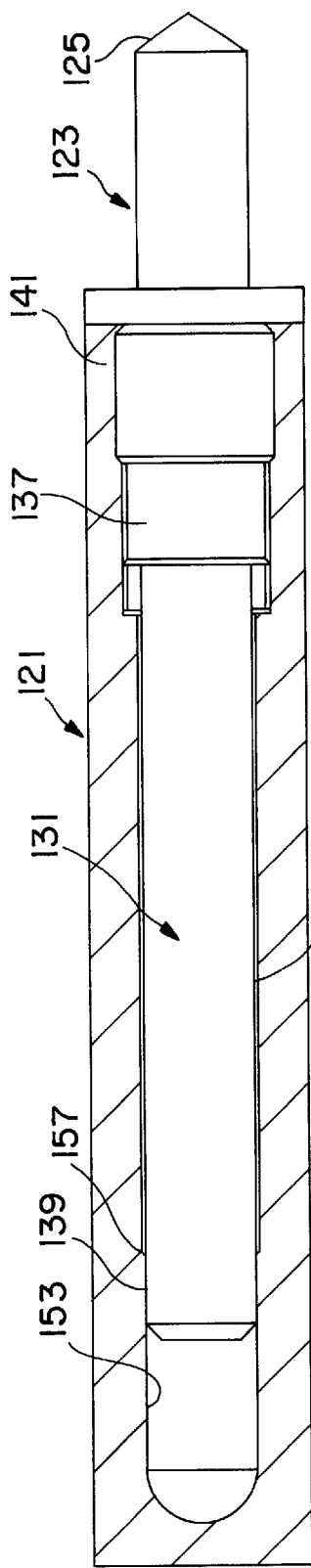
FIG. 2A is a side, partially cross-sectional view of a tool extender and tool assembly according to another embodiment of the present invention.
Figure 2B:
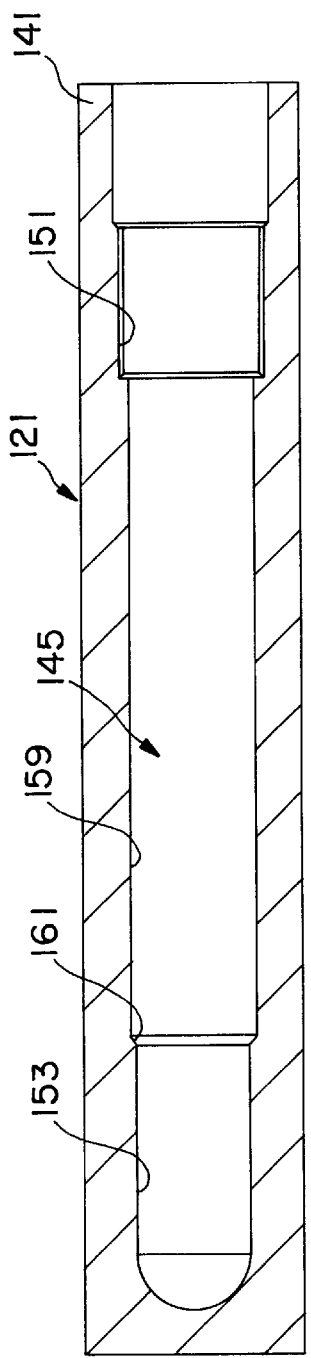
FIG. 2B is a side, cross-sectional view of the tool extender of FIG. 2A.
Figure 2C:
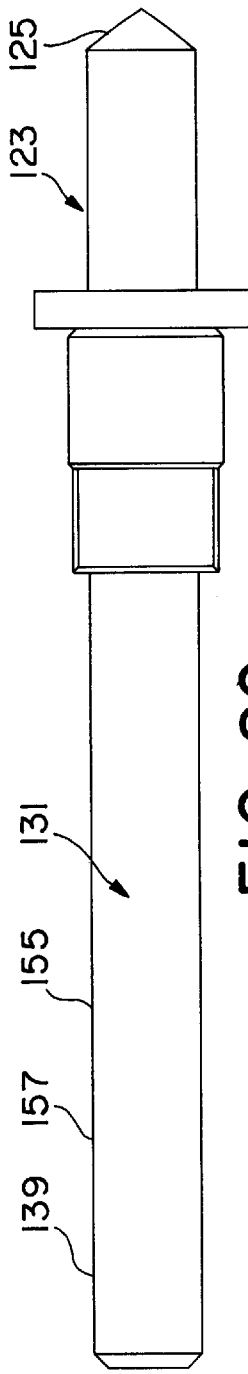
FIG. 2C is a side view of the tool of FIG. 2A.

FIGS. 2A–2C show another embodiment of the present invention wherein the tool extender 121 and tool 123 are substantially the same as the tool extender 21 and the tool 23, except that a portion 155 of the shank 131 between the externally threaded portion 137 and a first end 157 of the second guide portion 139 closest to the first end 125 of the tool is of equal diameter to the first end of the second guide portion. The portion 159 of the bore 145 between the internally threaded portion 151 and a first end 161 of the second internal guide portion 153 closest to the first end 141 of the tool extender 121 is of an equal diameter to or greater diameter than the first end 157 of the second internal guide portion 153.

In all of the embodiments of the present invention, upon installation of the tool into the tool extender, the first and second guide portions preferably enter the corresponding first and second internal guide portions before the external threads enter the internal threads. The bushing is preferably disposed relative to the threads so that the external threads do not reach a bottom point of the internal threads. The diameter of the second guide portion must be as small or smaller than the diameter of the threaded portion, and the diameter of the threaded portion must be as small or smaller than the diameter of the first guide portion.

With reference to FIGS. 1A–1C for purposes of discussion, if desired or necessary, the bushing 33 may be lockable and unlockable relative to the shank 31, such as by set screws 63 (FIG. 1C) and, when in an unlocked condition relative to the shank, the bushing may be axially movable relative to the shank as shown in phantom in FIG. 1C. In this way, a depth of installation of the tool 23 into the tool extender 21 may be adjustable. Similarly, if desired or necessary, the bushing 33, the first guide portion 35, and the externally threaded portion 37 may be lockable and unlockable relative to the shank 31 and, when in an unlocked condition relative to the shank, the bushing, the first guide portion, and the externally threaded portion may be axially movable relative to the shank. Again, such an arrangement will permit adjusting a depth of installation of the tool 23 into the tool extender 21. The bushing 33, the first guide portion 35, and the externally threaded portion 37 may be connected to one another, such as by comprising a sleeve portion that is axially movable along a cylindrical shank 31. Moreover, to further facilitate adjustment of the depth of installation of the tool extender or to modify a degree of support provided by the second guide portion, the second guide portion 39 may also be lockable and unlockable relative to the shank 31 and, when in an unlocked condition relative to the shank, the second guide portion may be axially movable relative to the shank as shown in phantom in FIG. 1C.

It will be appreciated from the foregoing that the tool extender and tool assembly according to the present invention permits extending a length from chuck to working portion of the tool while providing a high degree of support to the tool and minimizing the possibility of misalignment of the tool and damage to the tool or the tool extender. It is possible, using the present invention, to replace worn tools in a simple fashion, without also having to replace the tool extender. The invention can also be used in connection with existing tools by attaching appropriate bushings and other components onto existing shanks, thereby avoiding the need for completely replacing, for example, large collections of drill bits.

While this invention has been illustrated and described in accordance with a preferred embodiment, it is recognized that variations and changes may be made therein without departing from the invention as set forth in the claims.

What is claimed is:

1. A tool extender and tool assembly, comprising:
   a tool including a first and a second end, a working portion for performing an operation on a workpiece being provided at the first end and a shank extending from the working portion to the second end, the shank including a bushing, a first guide portion, an externally threaded portion, and a second guide portion arranged successively in a direction away from the working portion;
   a tool extender including a first end and a second end, the tool extender including a substantially cylindrical bore in which the shank is receivable up to the bushing, the bushing abutting against a forward edge of the tool extender at the first end, the bore including a first internal guide portion, an internally threaded portion for mating with the externally threaded portion, and a second internal guide portion arranged successively in a direction toward the second end of the tool extender; and
   the tool and the tool extender being shaped such that, when the bushing abuts against the forward edge of the tool extender and the internally threaded portion and the externally threaded portion are mated, the first guide portion and the second guide portion are disposed adjacent the first internal guide portion and the second internal guide portion of the bore.

2. The tool extender and tool assembly as set forth in claim 1, wherein the second guide portion is circular in cross-section.

3. The tool extender and tool assembly as set forth in claim 2, wherein the second internal guide portion is circular.

4. The tool extender and tool assembly as set forth in claim 2, wherein the second internal guide portion is conical and decreases in diameter in a direction toward the second end of the tool extender.

5. The tool extender and tool assembly as set forth in claim 1, wherein the second guide portion is conical and decreases in diameter in a direction toward the second end of the tool.

6. The tool extender and tool assembly as set forth in claim 5, wherein the second internal guide portion is circular.

7. The tool extender and tool assembly as set forth in claim 5, wherein the second internal guide portion is conical and decreases in diameter in a direction toward the second end of the tool extender.

8. The tool extender and tool assembly as set forth in claim 1, wherein the first guide portion is circular in cross-section.

9. The tool extender and tool assembly as set forth in claim 8, wherein the first internal guide portion is circular.

10. The tool extender and tool assembly as set forth in claim 8, wherein the first internal guide portion is conical and decreases in diameter in a direction toward the second end of the tool extender.

11. The tool extender and tool assembly as set forth in claim 1, wherein the first guide portion is conical and decreases in diameter in a direction toward the second end of the tool.

12. The tool extender and tool assembly as set forth in claim 11, wherein the first internal guide portion is circular.

13. The tool extender and tool assembly as set forth in claim 11, wherein the first internal guide portion is conical and decreases in diameter in a direction toward the second end of the tool extender.

14. The tool extender and tool assembly as set forth in claim 1, wherein a portion of the shank between the externally threaded portion and a first end of the second guide portion closest to the first end of the tool is of a smaller diameter than the first end of the second guide portion.

15. The tool extender and tool assembly as set forth in claim 14, wherein a portion of the bore between the internally threaded portion and a first end of the second internal guide portion closest to the first end of the tool extender is of an equal diameter to the first end of the second internal guide portion.

16. The tool extender and tool assembly as set forth in claim 1, wherein a portion of the shank between the externally threaded portion and a first end of the second guide portion closest to the first end of the tool is of equal diameter to the first end of the second guide portion.

17. The tool extender and tool assembly as set forth in claim 16, wherein a portion of the bore between the internally threaded portion and a first end of the second internal guide portion closest to the first end of the tool extender is of a greater diameter than the first end of the second internal guide portion.

18. The tool extender and tool assembly as set forth in claim 16, wherein a portion of the bore between the internally threaded portion and a first end of the second internal guide portion closest to the first end of the tool extender is of an equal diameter to the first end of the second internal guide portion.

19. The tool extender and tool assembly as set forth in claim 1, wherein the internally threaded portion and the externally threaded portion are threaded in a direction opposite an intended direction of rotation of the tool.

20. The tool extender and tool assembly as set forth in claim 1, wherein the bushing is lockable and unlockable relative to the shank and, when in an unlocked condition relative to the shank, the bushing is axially movable relative to the shank.

21. The tool extender and tool assembly as set forth in claim 20, wherein the bushing, the first guide portion, and the externally threaded portion are lockable and unlockable relative to the shank and, when in an unlocked condition relative to the shank, the bushing, the first guide portion, and the externally threaded portion are axially movable relative to the shank.

22. The tool extender and tool assembly as set forth in claim 21, wherein the bushing, the first guide portion, and the externally threaded portion are connected to one another.

23. The tool extender and tool assembly as set forth in claim 22, wherein the second guide portion is lockable and unlockable relative to the shank and, when in an unlocked condition relative to the shank, the second guide portion is axially movable relative to the shank.

24. The tool extender and tool assembly as set forth in claim 21, wherein the second guide portion is lockable and unlockable relative to the shank and, when in an unlocked condition relative to the shank, the second guide portion is axially movable relative to the shank.

25. The tool extender and tool assembly as set forth in claim 20, wherein the second guide portion is lockable and unlockable relative to the shank and, when in an unlocked condition relative to the shank, the second guide portion is axially movable relative to the shank.

* * * * *